April 26, 1960     A. G. DEAN     2,933,916
LOCK ATTACHMENT FOR ACCELERATOR LINKAGE
Filed March 18, 1958
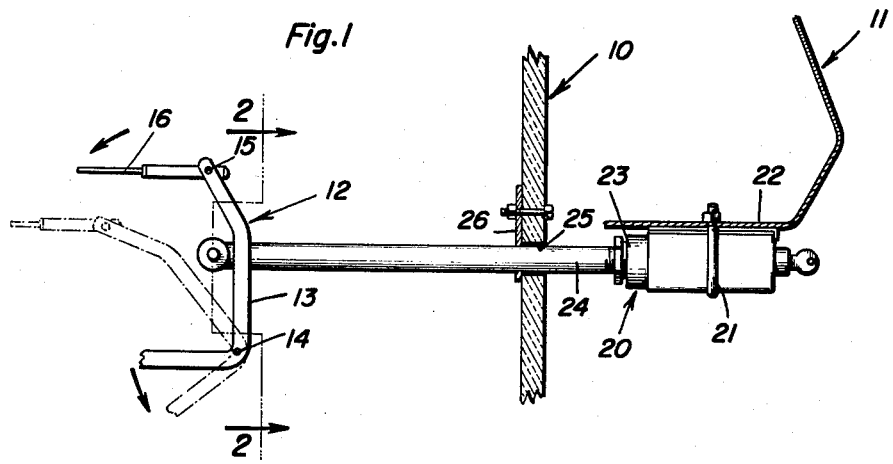
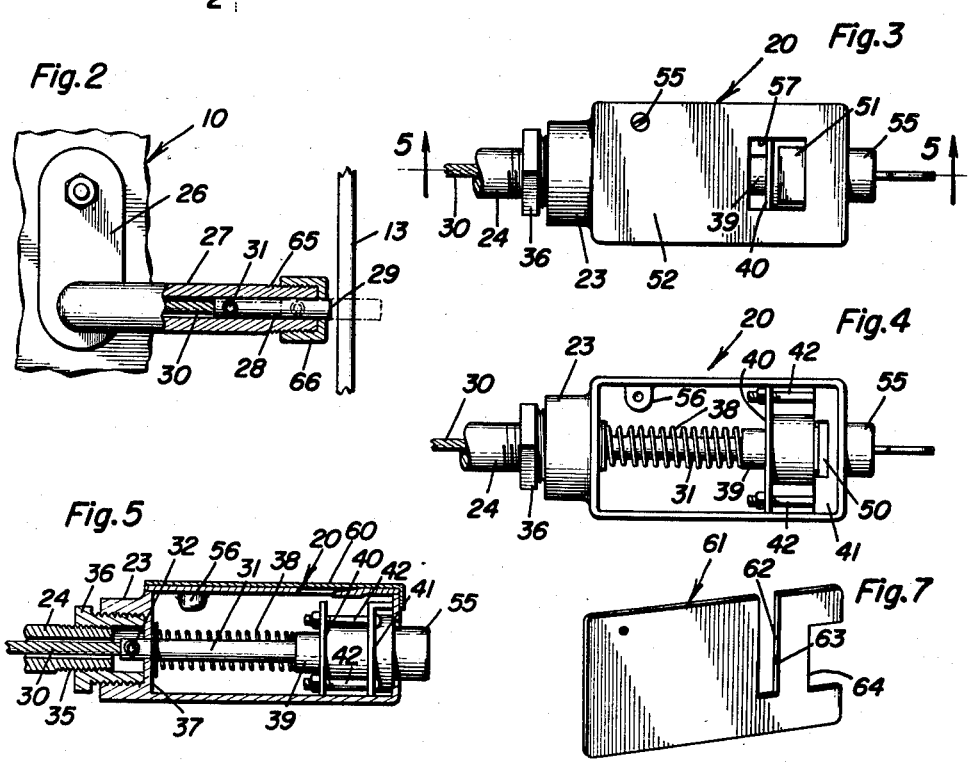
Arrefus G. Dean
INVENTOR.
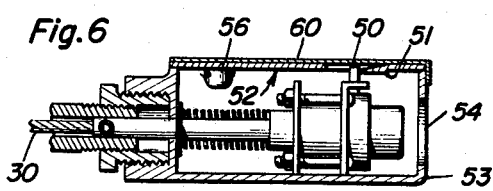

United States Patent Office
2,933,916
Patented Apr. 26, 1960

2,933,916
LOCK ATTACHMENT FOR ACCELERATOR LINKAGE

Arrefus G. Dean, Warren, Ohio

Application March 18, 1958, Serial No. 722,267

4 Claims. (Cl. 70—192)

This invention relates in general to automotive attachments and pertains more particularly to a device for preventing normal operation of a motor vehicle even though the vehicle may be broken into and its engine started.

Because of the large expansive glass utilized in motor vehicles, locked doors present no real obstacle to a would-be thief. Likewise, the ordinary ignition switch may easily be circumvented by using a jumper wire across the normally locked contacts thereof and for these reasons, the breaking into and operating of modern motor vehicles in a relatively easy matter. It is therefore of primary concern in connection with this invention to provide means for positively blocking operation of the accelerator linkage of an automotive vehicle so that even if the same is broken into and the engine started, the vehicle cannot be operated in the normal manner since little more than the normal idle speed may be attained due to the blocking mechanism.

Another object of this invention is to provide a device of the character described above which is key operated and which is so constructed as to be fool-proof in operation and which may not be easily tampered with.

A further object of this invention is to provide a blocking mechanism for the accelerator linkage of an automotive vehicle which may be easily and readily installed in existing vehicles and which consists essentially of a lock case affixed to the underside of the instrument panel in the vehicle within the driver's compartment and which is provided with a rigid cable guide housing extending forwardly therefrom through the fire wall of a vehicle and terminating at a point adjacent the accelerator linkage within the engine compartment and wherein cable means operatively associated with the cable housing or guide is manipulated by a key-operated lock within a lock mechanism so as to selectively project a finger element into blocking relationship with the accelerator linkage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a section taken through an automotive vehicle and illustrating the invention in operative association therewith.

Figure 2 is an end view partly in section showing the attachment in relation to the accelerator linkage and illustrating, in dotted lines, the blocking position of the attachment;

Figure 3 is a bottom plan view of the lock assembly with the cover plate thereof removed;

Figure 4 is a view similar to Figure 3 but showing the lock plate removed and showing details of the internal construction of the lock assembly;

Figure 5 is a vertical section taken substantially along the plane of section line 5—5 in Figure 3 and further illustrating details of the internal construction of the lock assembly;

Figure 6 is a view similar to Figure 5 but illustrating the lock in the inwardly projected, blocking position; and Figure 7 is a perspective view of a modified form of lock plate.

Referring at this time more particularly to Figure 1, the reference character 10 indicates in general by the firewall separating the driver's or passenger's compartment from the engine compartment of an automotive vehicle whereas the reference character 11 indicates in general a portion of the usual instrument panel within the passenger compartment. The engine compartment lies upon the left hand side of the firewall 10 in Figure 1 and a portion of the accelerator linkage assembly is indicated generally by the reference character 12 and it will be seen to include the bell-crank 13 pivoted as at 14 and having its upper end carrying a ball stud 15 by means of which the throttle rod 16 is pivotally attached to the upper end of the bell-crank. It is to be appreciated that the lower end of the bell-crank is connected through suitable mechanisms to the conventional foot accelerator pedal. The aforementioned construction is entirely conventional in nature and although not all automobiles use a linkage system identical to that illustrated in Figure 1, it is common, within some point in the linkage system, to utilize a bell-crank similar to that indicated by the reference character 13. It is with the bell-crank 13 that the instant invention cooperates to block normal actuation of the accelerator assembly although it is to be understood that the invention need not be necesarily limited to association with the precise accelerator linkage assemblage illustrated in the drawings.

The bell-crank 13 is shown in full lines in Figure 1 in its normal position, that is with the accelerator foot pedal in the normal position at which time the engine would be idling and in dotted lines the bell-crank is illustrated in the full open throttle position. In other words, the upper end of the bell-crank moves to the left in Figure 1 between the closed and opened throttle position of the associated carburetor or the like.

The attachment forming this invention consists essentially of a housing or container indicated generally by the reference character 20 and which is suitably secured as by a U-bolt 21 to the underside 22 of the instrument panel 11 or in any other suitable rigid or fixed position within the passenger's compartment of the vehicle. Extending forwardly from the rear end boss 23 of the assembly 20 is a rigid tube 24 which projects through a suitable opening 25 provided in the firewall 10 and which may be covered on the engine compartment side by a suitable plate element 26. The tube 24 extends forwardly into the engine compartment on one side of the bell-crank 13 and is provided with a lateral directed terminal end portion 27, see particularly Figure 2, which terminates just short of and to the same side of the bell-crank 13 as the main body portion of the tube.

Slidably disposed within the terminal end portion 27 of the tube is a finger or plunger 28 which, in the normal position, has its end portion 29 spaced a slight distance from the bell-crank 13 and clearing the same so as to permit normal actuation of the accelerator linkage. Attached to the plunger or finger 28 is a flexible cable element 30, the anchoring between these two members being effected by crimping or by the setscrew indicated by the reference character 31 and it will be readily apparent from Figure 2 that when the cable 30 is forced outwardly with respect to the tube 24, the finger or plunger 28 will be projected outwardly to the dotted line position shown in Figure 2 so as to extend forwardly of the upper end portion 13 of the bell-crank and so as to prevent normal operation of the accelerator linkage of the vehicle. It is to be understood of course, that the tube 24 and the mounting of the housing 20 are such as to be sufficiently rigid as to prevent manual flexing or bending of the attachment to one side, when the same is in the blocking position, so as to permit normal actuation of the accelerator linkage.

As can be seen in Figure 5, the cable 30 is attached, on its inner end to a stem element 31, the anchoring being effected by gripping or by suitable setscrew 32 as shown. It will also be understood that the tube 24 is secured in any desired manner to the container 20 proper. In the drawings, the end portion 35 of the tube is threaded and is received within a nut member 36 which is in turn externally threaded and received in the boss portion 23 of the container 20. It is to be appreciated that some means should be provided to prevent relative rotation between the tube 24 and the container 20, this may be effected by suitable staking or welding of the parts, as desired.

The interior wall portion 37 of the container 20 provides a seat for the compression spring 38 which surrounds the stem 31 and seats upon its opposite end with the forward portion of a lock cylinder 39 slidably carried within the container or housing 20 by means of a carriage assembly including a pair of generally rectangular plates 40 and 41 rigid with the lock cylinder 39 and which may be fixedly secured to each other by means of the through bolts 42.

The carriage assembly including the two plates 40 and 41 prevent rotation of the lock cylinder within the container 20 which is of generally rectangular cross-section interiorly thereof and at the same time these plates permit the lock cylinder to be slid between the unlocked position shown in Figure 5 to the locked position illustrated in Figure 6. In Figure 6, it will be appreciated that the lock cylinder has been forced inwardly and the associated key thereof turned, and then removed so as to project the bolt 50 from the lock cylinder and which bolt projects forwardly of the striker tongue 51 on lock plate 52 so as to hold the lock cylinder in the blocking position. At the same time, it will be appreciated that the cable 30 will have forced the plunger or finger 28 outwardly to the dotted line position shown in Figure 2 with the parts being in the position of Figure 6.

The housing 20 is provided with a rear end wall 53 provided with an opening 54 therein through which the end 55 of the lock cylinder projects when the parts are in the unlocking position. The upper side of the container 20 is open and the lock plate 52 is rigidly affixed thereto by any suitable means such as the screw 55 engageable within the tongue 56 on the housing 20 and the lock plate, as seen in Figure 3, is provided with a cutaway or opening 57 presenting the striker tongue or plate portion 51 previously described. Preferably, a top cover plate 60 is provided over the lock plate 52 and which forms a protective cover for attachment.

The lock plate 52 may of course take many different forms as for example the modified form shown in Figure 7 and indicated generally by the reference character 61. In this case, the lock plate is provided with a laterally extending notch 62 which forms the striker edge portion 63 and being provided with a further notch 64 in the end thereof to clear the bolt 50 should it be desired to remove the key when the parts are in the unlocked position.

It is preferred that the terminal end 27 of the tube 24 be threaded as indicated by the reference character 65, see Figure 2, and an end cap 66 secured thereon, which end cap is disposed in very close fitting relationship with the plunger or finger 28 so as to obviate deflection thereof when the same is in the projected position and the accelerator linkage bell crank 13 is forced thereagainst.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automotive attachment for selectively blocking normal operation of the accelerator linkage of an associated automotive vehicle comprising a rectangular housing rigidly affixed to the vehicle within the passenger's compartment thereof, said housing having an open top and being provided with a lock plate rigidly affixed thereto and in covering relationship to the open top, said lock plate having a striker edge thereon, an opening in said lock plate adjacent said striker edge, a lock cylinder slidably disposed within said housing and having a bolt projectable into said opening into engagement with said striker edge to normally hold said lock cylinder in an inwardly projected position with respect to the housing, a pair of rectangular plates fixed to said lock cylinder and slidable in said rectangular housing to prevent relative rotative movement between said housing and cylinder a stem on said lock cylinder projecting through an end wall of said housing, a rigid tube fixed to said housing in registry with said stem and extending forwardly thereof into the associated engine compartment of the vehicle and terminating in closely spaced relationship to the associated accelerator linkage, a plunger slidably disposed in said tube and projectable from the free end thereof adjacent the accelerator linkage to block normal operation of the same, a flexible cable connecting said plunger and said stem whereby the plunger is projected in response to movement of said lock cylinder to the inwardly projected position within the housing.

2. The attachment as defined in and by claim 1 wherein said tube is provided with a laterally directed terminal end portion within which said plunger is slidable.

3. The assembly as defined in and by claim 1 including a compression spring interposed between said housing wall and said lock cylinder for normally urging the cylinder to an outwardly projected position with respect to the housing wherein the plunger is out of blocking position with respect to the associated accelerator linkage.

4. An automotive attachment for selectively blocking normal operation of the accelerator linkage of an associated automotive vehicle comprising a rectangular housing rigidly affixed to the vehicle within the passenger's compartment thereof, said housing having an open top and being provided with a lock plate rigidly affixed thereto and in covering relationship to the open top, said lock plate having a striker edge thereon, an opening in said lock plate adjacent said striker edge, a lock cylinder slidably disposed within said housing and having a bolt projectable into said opening into engagement with said striker edge to normally hold said lock cylinder in an inwardly projected position with respect to the housing, a pair of rectangular plates fixed to said lock cylinder and slidable in said rectangular housing to prevent relative rotative movement between said housing and cylinder, a stem on said lock cylinder projecting through an end wall of said housing, a rigid tube fixed to said housing in registry with said stem and extending forwardly thereof into the associated engine compartment of the vehicle and terminating in closely spaced relationship to the associated accelerator linkage, a plunger slidably disposed in said tube and projectible from the free end thereof adjacent the accelerator linkage to block normal operation of the same, a flexible cable connecting said plunger and said stem whereby the plunger is projected in response to movement of said lock cylinder to the inwardly projected position within the housing, a second opening in said lock plate for allowing projection of said bolt therethrough when said lock cylinder is not in said inwardly projected position.

References Cited in the file of this patent

UNITED STATES PATENTS

| | | |
|---|---|---|
| 1,764,383 | Bezek | June 17, 1930 |
| 1,832,362 | Cullinan | Nov. 17, 1931 |
| 1,846,782 | Ballamos | Feb. 23, 1932 |

FOREIGN PATENTS

| | | |
|---|---|---|
| 458,096 | Italy | June 23, 1950 |